Patented Nov. 11, 1941

2,262,249

UNITED STATES PATENT OFFICE 2,262,249

SUBSTITUTED CYCLOALKYL PHENOLS AND METHOD OF MAKING SAME

Ralph P. Perkins and Fred Bryner, Midland, Mich., assignors to The Dow Chemical Company, Midland, Mich., a corporation of Michigan No Drawing. Application March 24, 1939, Serial No. 263,914

14 Claims. (Cl. 260—619)

This invention relates to a new class of substituted cycloalkyl phenols and to a method of making the same.

The compounds of the present invention correspond to the general formula (1) 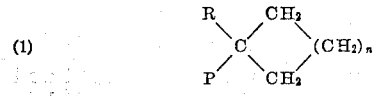

wherein R is an aryl, halo-aryl, or lower alkoxy aryl radical of the benzene series, P is a hydroxylated aryl, mono-halo-aryl, or lower alkoxy aryl radical having a hydroxyl group ortho or para to the attached cycloalkane radical, and $n$ is a small integer. They are useful as germicides, fungicides, and as intermediates in the manufacture of synthetic resins and insecticides.

The new products may be prepared by reacting a substituted cycloalkene corresponding to the formula (2) 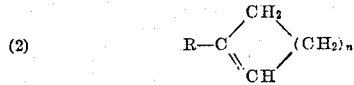

wherein R is an aryl, halo-aryl, or lower alkoxy aryl radical of the benzene series and $n$ is a small integer, with a suitable phenol, i. e. with a hydroxylated aromatic hydrocarbon, monohalo hydrocarbon, or lower alkoxy hydrocarbon having a hydrogen atom in a position ortho or para to a hydroxyl group, in the presence of a condensation catalyst.

According to one procedure, the phenol to be reacted and the condensation catalyst are mixed and heated to the desired reaction temperature, e. g. 20° to 250° C., depending upon the reactants employed, and preferably 120° to 150° C. The substituted cycloalkene is then added slowly with stirring, preferably beneath the surface of the mixture and in the zone of most powerful agitation. When addition of the cycloalkene has been completed, heating of the mixture is continued for a time to allow the reaction to reach completion, after which the catalyst is removed or destroyed by known means. The resulting crude product may then be fractionally distilled at reduced pressure to separate the desired substituted cycloalkyl phenol. Although the reactants and catalyst may be employed in widely varying proportions, we find it advantageous to mix the phenol with a small proportion, i. e. 0.1 to 10.0 per cent, preferably 0.2 to 0.5 per cent of its weight of catalyst, and then add slowly 0.3 to 1.0 molecular equivalent of the substituted cycloalkene. If the phenolic reactant is a solid at reaction temperatures, the process may be conducted in an inert solvent.

When the cycloalkylation of a phenol is carried out as described, the reaction product is largely a para-cycloalkylated phenol, provided a position para to the hydroxyl group of the phenolic reactant is open for substitution; isomeric phenols are formed only in small proportion. When the para-position of the reactant phenol is not open for substitution, the cycloalkyl group will enter a position ortho to a hydroxyl group. If, however, all the positions ortho and para to the hydroxyl groups are filled, reaction according to the invention has not been found possible. For that reason, the phenolic reactants in our process are limited to those phenols which have a hydrogen atom in a position ortho or para to a hydroxyl group. Examples of such operable phenolic reactants are hydroxylated aromatic hydrocarbons such as phenol, o-cresol, m-cresol, p-tertiarybutyl phenol, thymol, catechol, hydroquinone, pyrogallol, alpha-naphthol, p-phenyl phenol, etc., hydroxylated aromatic mono-halo hydrocarbons, e. g. o-chlorophenol, p-bromo phenol, 2-methyl-5-brom hydroquinone, 2-hydroxy-5-chloro biphenyl, etc., and hydroxylated aromatic lower alkoxy hydrocarbons, such as guaiacol, creosol, 2-ethoxy phenol, and the like.

The olefinic reactant in our process, as hereinbefore indicated, is a 1-substituted cycloalkene having as the substituting group an aryl, halo-aryl, or lower alkoxy aryl radical of the benzene series. Thus, for instance, we may employ such compounds as 1-phenyl cyclobutene, 1-phenyl cyclopentene, 1-(o-tolyl) cyclopentene, 1-phenyl cyclohexene, 1-(p-isopropyl phenyl) cyclohexene, 1-(o, p-diethyl-phenyl) cyclohexene, 1-phenyl cycloheptene, 1-(p-tertiarybutyl-phenyl) cycloheptene, 1-(o-chlorophenyl) cyclohexene, 1-(m-m-dibrom-o-tolyl) cyclopentene, 1-(o-methoxy phenyl) cyclopentene, 1-(p-ethoxy phenyl) cyclohexene, and many other olefines having the general Formula (2) above.

In carrying out the reaction according to the invention, we may use any of a wide variety of known condensation catalysts, e. g. aluminum chloride, zinc chloride, sulfuric acid, acid-activated bleaching earths, etc. In practice, however, we much prefer to employ as catalyst a small proportion of hydrogen chloride or hydrogen bromide, either per se or in aqueous solution. These latter catalysts permit a smooth reaction with minimum formation of by-products, and are easily removed from the crude cyclo-alkylated product. In addition they have the advantage that they do not tend to bring about intramolecular rearrangements such as those which ordinarily occur to a considerable extent when the cyclo-olefin or phenol reactant contains one or more alkoxy groups.

The following examples are illustrative of the invention but are not to be construed as limiting its scope:

Example 1

A mixture of 1 mol (94 grams) of phenol and 0.6 c. c. of concentrated hydrochloric acid was heated to a temperature of 120°–130° C., and 0.5 mol (79 grams) of 1-phenyl cyclohexene was added slowly with agitation during 0.5 hour. The resulting mixture was then heated for 2.0 hours more at a temperature of 130°–140° C., after which it was cooled and the hydrochloric acid neutralized with aqueous sodium hydroxide. This crude product was fractionally distilled under an absolute pressure of 25 millimeters of mercury, there being recovered unreacted 1-phenyl cyclohexene, phenol, and 62.2 grams of a fraction boiling at 250°–260° C. (mostly at 256° C.). This latter material, which had a freezing point of 123° C., was found to be substantially pure p-(1-phenyl cyclohexyl) phenol

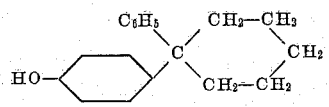

When recrystallized from alcohol and then from chlorobenzene, it was a white crystalline solid having a melting point of 125.6°–126.1° C. The yield was 93 per cent based upon the quantity of phenol which had reacted.

Example 2

1-phenyl cyclopentene was reacted with phenol in the proportion and under approximately the same conditions as in Example 1. The crude product was distilled at a pressure of 13 millimeters of mercury, there being obtained a fraction boiling at 216° C. to 227° C. This material, which had a freezing point of 67° C., was found to be substantially pure p-(1-phenyl cyclopentyl) phenol

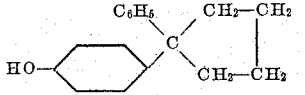

When recrystallized from cyclohexane, this product was a white crystalline solid having a melting point of 78.1°–78.6° C.

Example 3

1-phenyl cyclopentene was reacted with resorcinol according to the procedure of Example 1, and the crude product was purified by fractional distillation and then by recrystallization from benzene. In this way there was obtained p-(1-phenyl cyclopentyl) resorcinol,

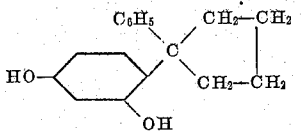

having a melting point of 109°–110° C.

Example 4

1-phenyl cyclohexene was reacted with catechol and the product was purified as in Example 1. There was obtained p-(1-phenyl cyclohexyl) catechol

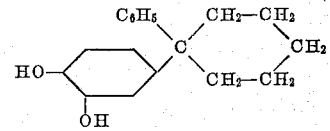

a white crystalline solid having a melting point of 98.5°–99° C., and a boiling point of about 257° C. at 10 millimeters pressure.

Example 5

A mixture of 2 gram-mols of o-chloro phenol, 1 gram-mol of 1-phenyl cyclohexene, and 1 c. c. of concentrated hydrobromic acid was heated in a closed tube at a temperature of 210°–240° C. for 2.5 hours. The mixture was then cooled, neutralized, and fractionally distilled at reduced pressure, the fraction distilling at 210°–220° C. at 6 millimeters pressure being collected. This material was found to be p-(1-phenyl cyclohexyl) o-chloro phenol,

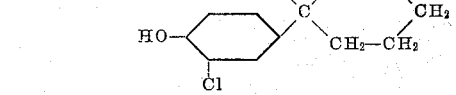

The term "aryl" as hereinbefore employed and as used in the following claims is intended to refer only to aromatic hydrocarbon radicals.

Other modes of applying the principle of the invention may be employed instead of those explained, change being made as regards the details disclosed, provided the product or method stated in any of the following claims or the equivalent of such stated product or method be obtained or employed.

We claim:

1. A 1-substituted cycloalkyl phenol corresponding to the general formula

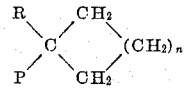

wherein R is a mononuclear radical selected from the class consisting of aryl, nuclear halo-aryl, and nuclear lower alkoxy-aryl radicals, P is a phenolic radical having a hydroxyl group in one of the positions ortho and para to that of the attached cycloalkane radical and selected from the class consisting of nuclearly hydroxylated aryl, nuclearly hydroxylated nuclear mono-halo-aryl, and nuclearly hydroxylated nuclear lower-alkoxy-aryl radicals, and $n$ is a small integer.

2. A 1-aryl cycloalkyl phenol corresponding to the general formula

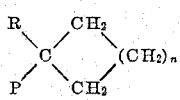

wherein R is a mononuclear aryl radical, P is a nuclearly hydroxylated aryl radical having a hydroxyl group in one of the positions ortho and para to that of the attached cycloalkane radical, and $n$ is an integer not greater than 4.

3. A 1-phenyl cycloalkyl phenol corresponding to the general formula

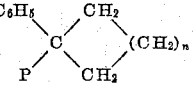

wherein P is a hydroxylated phenyl radical and $n$ is one of the integers 2 and 3.

4. Para-(1-phenyl cyclohexyl) phenol, a white crystalline solid having a melting point of about 126° C.

5. Para-(1-phenyl cyclopentyl) phenol, a white crystalline solid having a melting point of about 78° C.

6. Para-(1-phenyl cyclohexyl) catechol, a white crystalline solid having a melting point of about 99° C.

7. The method of preparing a 1-substituted cycloalkyl phenol which comprises reacting a substituted cycloalkylene corresponding to the formula

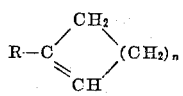

wherein R is a mononuclear radial selected from the class consisting of aryl, nuclear halo-aryl, and nuclear lower alkoxy aryl radicals, and $n$ is a small integer, with a phenol having a hydrogen atom in one of the positions ortho and para to a hydroxyl group and selected from the class consisting of nuclearly hydroxylated aromatic hydrocarbons, nuclearly hydroxylated nuclear mono-halo aromatic hydrocarbons, and nuclearly hydroxylated nuclear lower alkoxy aromatic hydrocarbons, in the presence of a condensation catalyst.

8. The method of preparing a 1-substituted cycloalkyl phenol which comprises reacting a substituted cycloalkene corresponding to the formula

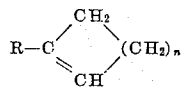

wherein R is a mononuclear radical selected from the class consisting of aryl, nuclear halo-aryl, and nuclear lower alkoxy aryl radicals and $n$ is an integer not greater than 4, with a phenol having a hydrogen atom in one of the positions ortho and para to a hydroxyl group and selected from the class consisting of nuclearly hydroxylated aromatic hydrocarbons, nuclearly hydroxylated nuclear mono-halo aromatic hydrocarbons, and nuclearly hydroxylated nuclear lower alkoxy aromatic hydrocarbons, in the presence of a small proportion of a condensation catalyst.

9. The method of preparing a 1-substituted cycloalkyl phenol which comprises reacting a substituted cycloalkene corresponding to the formula

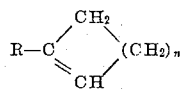

wherein R is a mononuclear radical selected from the class consisting of aryl, nuclear halo-aryl, and nuclear lower alkoxy aryl radicals, and $n$ is an integer not greater than 4, with a phenol having a hydrogen atom in one of the positions ortho and para to a hydroxyl group and selected from the class consisting of nuclearly hydroxylated aromatic hydrocarbons, nuclearly hydroxylated nuclear mono-halo aromatic hydrocarbons, and nuclearly hydroxylated nuclear lower alkoxy aromatic hydrocarbons, in the presence of a small proportion of a hydrogen halide selected from the class consisting of hydrogen chloride and hydrogen bromide.

10. The method of preparing a 1-aryl cycloalkyl phenol which comprises reacting a cycloalkene corresponding to the formula

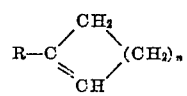

wherein R is a mononuclear aryl radical and $n$ is an integer not greater than 4, with a nuclearly hydroxylated aryl hydrocarbon having a hydrogen atom in one of the positions ortho and para to a hydroxyl group, in the presence of a small proportion of a condensation catalyst.

11. The method of preparing a 1-aryl cycloalkyl phenol which comprises reacting a cycloalkene corresponding to the formula

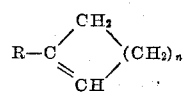

wherein R is a mononuclear aryl radical and $n$ is an integer not greater than 4, with a nuclearly hydroxylated aryl hydrocarbon having a hydrogen atom in one of the positions ortho and para to a hydroxyl group, in the presence of a small proportion of a hydrogen halide selected from the class consisting of hydrogen chloride and hydrogen bromide.

12. The method of preparing a (1-phenyl cycloalkyl phenol) which comprises reacting a 1-phenyl cycloalkene selected from the class consisting of 1-phenyl cyclopentene and 1-phenyl cyclohexene with a hydroxylated benzene having a hydrogen atom in one of the positions ortho and para to a hydroxyl group, in the presence of a small proportion of a condensation catalyst.

13. The method of preparing a (1-phenyl cycloalkyl phenol) which comprises reacting a 1-phenyl cycloalkene selected from the class consisting of 1-phenyl cyclopentene and 1-phenyl cyclohexene with a hydroxylated benzene having a hydrogen atom in one of the positions ortho and para to a hydroxyl group, in the presence of a small proportion of a hydrogen halide selected from the class consisting of hydrogen chloride and hydrogen bromide.

14. The method of preparing a 1-substituted cycloakyl phenol which comprises reacting a substituted cyclolkene corresponding to the formula

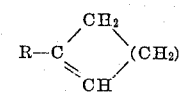

wherein R is a mononuclear radical selected from the class consisting of aryl, nuclear halo-aryl, and nuclear lower alkoxy aryl radicals, and $n$ is an integer not greater than 4, with a phenol having a hydrogen atom in one of the positions ortho and para to a hydroxyl group and selected from the class consisting of hydroxylated aromatic hydrocarbons, nuclearly hydroxylated nuclear mono-halo aromatic hydrocarbons, and nuclearly hydroxylated nuclear lower alkoxy aromatic hydrocarbons, in the presence of between about 0.1 and about 10.0 per cent by weight relative to the phenol of a hydrogen halide selected from the class consisting of hydrogen chloride and hydrogen bromide, and at a temperature between about 20° C. and about 250° C.

RALPH P. PERKINS.
FRED BRYNER.